UNITED STATES PATENT OFFICE.

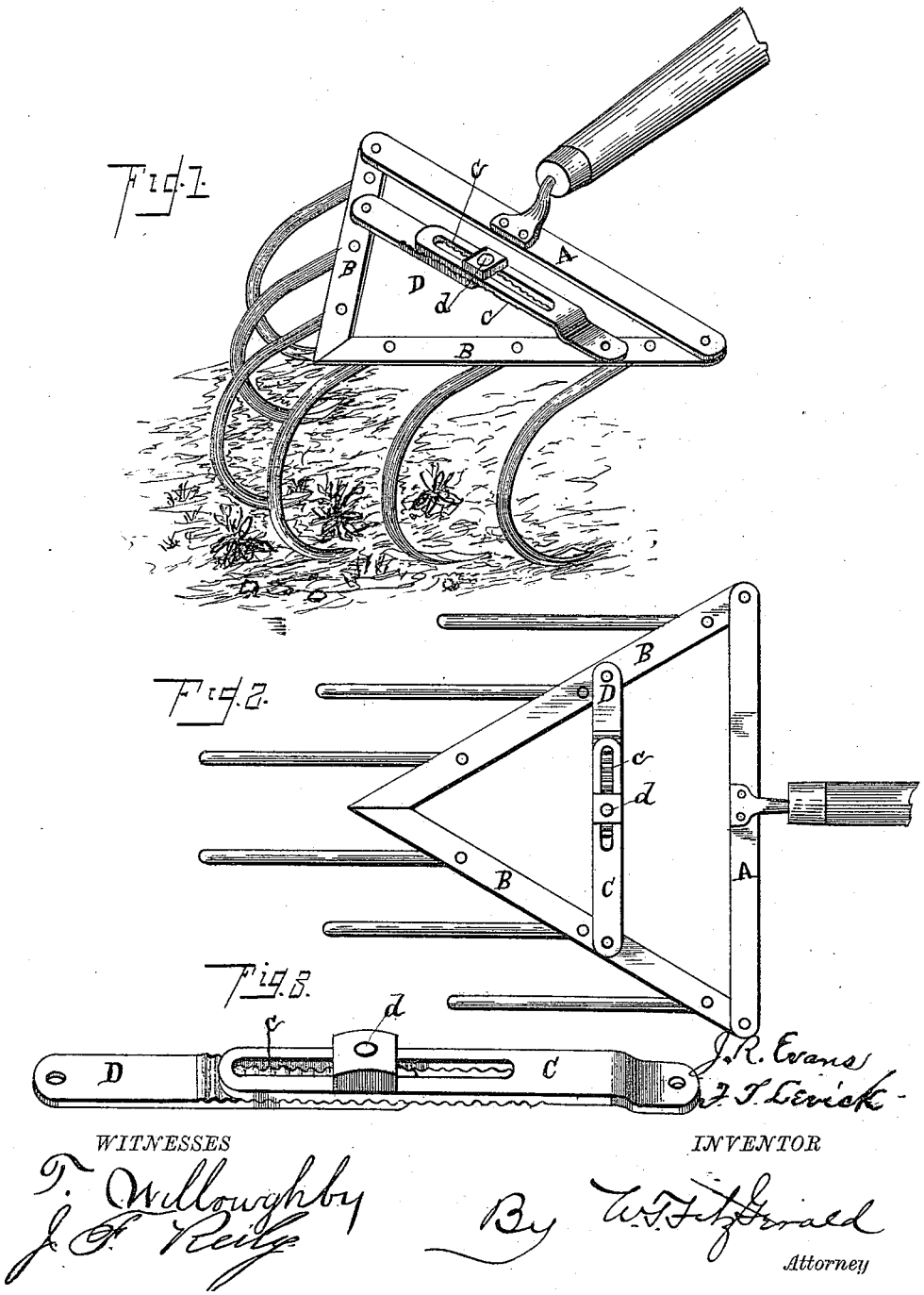

JOHN ROBERT EVANS AND FREDRICK THOMAS LEVICK, OF DUNCAN'S BRIDGE, MISSOURI; SAID LEVICK ASSIGNOR TO SAID EVANS.

CULTIVATOR.

SPECIFICATION forming part of Letters Patent No. 442,518, dated December 9, 1890.

Application filed May 19, 1890. Serial No. 352,347. (No model.)

*To all whom it may concern:*

Be it known that we, JOHN ROBERT EVANS and FREDRICK THOMAS LEVICK, citizens of the United States, residing at Duncan's Bridge, in the county of Monroe and State of Missouri, have invented certain new and useful Improvements in Cultivators; and we do hereby declare the following to be a full, clear, and exact description of the invention, such as will enable others skilled in the art to which it appertains to make and use the same.

Our invention relates to certain features involved in the construction of a hand-cultivator or garden-rake, as will be hereinafter described and claimed.

Figure 1 is a perspective view of our improved rake. Fig. 2 is a plan view, while Fig. 3 is a detail of the locking-arms.

The object of our invention is to provide an easily-operated and convenient form of cultivator or rake, whereby the teeth of the same can be separated so as to cultivate both sides of a growing row without disturbing such row.

Referring to the several parts of our invention, A is the rear section of the frame of our improved rake, to the middle of which is secured the means for attaching the handle, while pivotally secured to each end of said section are the forwardly-reaching bars BB, which are adapted to carry the teeth of the rake. These bars incline toward each other and are properly beveled at their free ends, that when they are brought in contact the general form of the frame, formed by the rear section and said bars, will be that of a triangle. Near the middle of one of said bars we pivotally secure the arm C, which reaches inwardly and is provided at its end with a longitudinal slot *c*, which is adapted to receive the securing-bolt, as will be hereinafter referred to. To the other bar at a point opposite we secure the arm D, which reaches inwardly sufficiently to be overlapped by the arm C, and is provided at its end with the securing-bolt *d*, as shown. The upper surface of arm D and the under surface of arm C are properly corrugated or roughened, so that when the bolt *d* is passed through the slot *c* in the arm C and the nut thereon tightened it will readily enable the arms to be securely though adjustably held together. It will be seen that we have thus produced an adjustable frame for our rake and that such adjustment is effected by the arms C and D having the construction as stated. The bars BB are provided with teeth, which are preferably hook-shaped in form, and may be pivotally or permanently secured to said bars, as preferred.

In operation the rake is drawn through the soil in the usual manner, and when it is desired to cultivate both sides of a growing row the nut on the bolt *d* is loosened and the free ends of the bars are spread apart to the desired point, when said nut is properly secured, and as the contacting surfaces of the arms are roughened they will be readily secured at any point.

Believing that further description of our invention is unnecessary and that the advantages of the same will be readily understood, we will now specifically claim the features of novelty therein involved.

Having thus described our invention, what we claim, and desire to secure by Letters Patent, is—

In an adjustable rake or cultivator, the triangular body formed of the members A and BB, the latter provided with hook-shaped teeth and having their free and front ends adjustable by means of the arms C and D, having roughened contacting surfaces adapted to be secured by the locking-bolt *d* at any point desired, substantially as described, and for the purposes named.

In testimony whereof we affix our signatures in presence of two witnesses.

JOHN ROBT. EVANS.
FREDRICK THOMAS LEVICK.

Witnesses:
J. A. W. HALTERMAN,
G. F. WATERS.